US012311444B2

(12) United States Patent
Sorea et al.

(10) Patent No.: US 12,311,444 B2
(45) Date of Patent: May 27, 2025

(54) METHOD OF EXTRUDING A POWDER METALLURGICAL COMPONENT

(71) Applicant: Grundfos Holding A/S, Bjerringbro (DK)

(72) Inventors: Alexandru Sorea, Aalborg Ø (DK); Peter Valler, Aalborg SØ (DK); Henrik Rasmussen, Rødkærsbro (DK)

(73) Assignee: Grundfos Holding A/S, Bjerringbro (DK)

( * ) Notice: Subject to any disclaimer, the term of this patent is extended or adjusted under 35 U.S.C. 154(b) by 65 days.

(21) Appl. No.: 17/781,645

(22) PCT Filed: Dec. 3, 2020

(86) PCT No.: PCT/EP2020/084448
§ 371 (c)(1),
(2) Date: Jun. 1, 2022

(87) PCT Pub. No.: WO2021/110828
PCT Pub. Date: Jun. 10, 2021

(65) Prior Publication Data

US 2022/0410258 A1 Dec. 29, 2022

(30) Foreign Application Priority Data

Dec. 4, 2019 (EP) .................................... 19213523

(51) Int. Cl.
*B22F 3/20* (2006.01)
*B22F 1/10* (2022.01)
(Continued)

(52) U.S. Cl.
CPC .................. *B22F 3/20* (2013.01); *B22F 1/10* (2022.01); *B22F 3/1021* (2013.01); *F26B 21/006* (2013.01); *B22F 2998/10* (2013.01)

(58) Field of Classification Search
CPC .. B22F 3/20; B22F 1/10; B22F 3/1021; B22F 2998/10; B22F 3/1115; F26B 21/006
See application file for complete search history.

(56) References Cited

U.S. PATENT DOCUMENTS 5,966,582 A * 10/1999 Chalasani ........... C04B 35/6365
419/36
6,665,949 B1 12/2003 Reis et al.
(Continued)

FOREIGN PATENT DOCUMENTS

CN 101195162 A 6/2008
CN 108885439 A 11/2018
(Continued)

OTHER PUBLICATIONS

Extended European Search Report; European Patent Office; European Application No. 19213523.4; Apr. 28, 2020; 9 pages.
(Continued)

*Primary Examiner* — Ricardo D Morales
(74) *Attorney, Agent, or Firm* — Taft Stettinius & Hollister LLP

(57) ABSTRACT

A method of manufacturing a component from metal-containing powder. A paste is prepared by mixing at least a powder comprising metal, a binder in an amount of 2 to 8 weight % of the paste, and liquid, such as water, in an amount of 5 to 25 weight % of the paste. The paste is transferred to an extruder, and the paste is extruded into a green body by using an extrusion pressure (P) of more than 50 bar. Then the green body is dried and sintered or oxidized to obtain the final component.

17 Claims, 3 Drawing Sheets

(51) Int. Cl.

| | |
|---|---|
| ***B22F 3/10*** | (2006.01) |
| ***F26B 21/00*** | (2006.01) |

(56) References Cited

U.S. PATENT DOCUMENTS

| | | | | |
|---|---|---|---|---|
| 2009/0146350 | A1* | 6/2009 | Noguchi | C04B 35/62635 264/630 |
| 2018/0065275 | A1 | 3/2018 | George et al. | |

FOREIGN PATENT DOCUMENTS

| | | | | | |
|---|---|---|---|---|---|
| CN | 110496967 | A | * | 11/2019 | B22F 3/1115 |
| DE | 3623511 | A1 | | 1/1988 | |
| EP | 1316538 | A1 | | 6/2003 | |
| EP | 2083000 | A1 | | 7/2009 | |
| JP | 2003129112 | A | * | 5/2003 | |
| JP | 2007190712 | A | * | 8/2007 | |

OTHER PUBLICATIONS

International Search Report; European Patent Office; International Application No. PCT/EP2020/084448; Jan. 29, 2021; 4 pages.

Written Opinion of the International Searching Authority; European Patent Office; International Application No. PCT/ EP2020/084448; Jan. 29, 2021; 7 pages.

Chinese Office Action; China National Intellectual Property Administration; Chinese Application No. 2020800839941; Feb. 1, 2024; 10 pages.

* cited by examiner

METHOD OF EXTRUDING A POWDER METALLURGICAL COMPONENT

CROSS-REFERENCE TO RELATED APPLICATIONS

This application is a U.S. National Phase of International PCT Application No. PCT/EP2020/084448 filed on Dec. 3, 2020, which claims priority to European Patent Application No. 19213523.4 filed on Dec. 4, 2019, each of which are incorporated herein by reference in their entirety.

FIELD OF THE INVENTION

The present invention relates to a method of extruding a powder metallurgical component. In particular it relates to a method with which it is possible to manufacture both simple and complex geometries.

BACKGROUND OF THE INVENTION

Within the technical field of mechanical engineering, the choice of manufacturing method for a given component depends on a number of parameters, including the material, the geometry of the component, and the quantity to be made. For many types of components made from metal, the method typically involves the assembly of sub-components e.g. by joining them by soldering or welding. However, in addition to this being a cumbersome method, it also involves a risk of formation of weaknesses and defects at the joining regions. This can be particularly critical, if the component is exposed to mechanical or thermal fatigue loading as that may cause initially small defects to grow into cracks of a critical size leading to fracture of the component.

Hence, an improved method of manufacturing metal components would be advantageous.

OBJECT OF THE INVENTION

Thus, it is an object of the present invention to provide a method of manufacturing with which metal components can be manufactured more efficiently than with known methods.

It is another object of at least some embodiments of the present invention to provide a method of manufacturing metal components having complex geometries with lower risks of built-in defects or weaknesses resulting from the manufacturing than with known methods.

It is a further object of the present invention to provide an alternative to the prior art.

In particular, it may be seen as an object of the present invention to provide a method of manufacturing a metal component that solves the above mentioned problems of the prior art.

SUMMARY OF THE INVENTION

Thus, the above described object and several other objects are intended to be obtained by providing a method of manufacturing a component from metal-containing powder, the method comprising the following steps:

preparing a paste by mixing at least:
- a powder comprising metal,
- a binder in an amount of 2 to 8 weight % of the paste,
- liquid, such as water, in an amount of 5 to 25 weight % of the paste, transferring the paste to an extruder, extruding the paste into a green body by using an extrusion pressure of more than 50 bar, drying the green body, and sintering or oxidizing the dried green body to bond the powder together and thereby form the component.

By "component" is meant any shape that can be made by this method. It includes both simple geometries, such as rods or plates, and more complex geometries, such as comprising inner channels or a plurality of protruding rods. An example of a possible use of such a complex geometry is as a heat sink. A heat sink is a passive heat exchanger that transfers the heat generated by an electronic or a mechanical device to a fluid medium, often air or a liquid coolant, where it is dissipated away from the device, thereby allowing regulation of the temperature of the device at optimal levels. Other examples of geometries will be shown in the figures.

By "paste" is meant a thick, soft, sticky substance made by mixing a liquid with a powder. In other words, pastes typically consist of a suspension of granular material in a background fluid. In the context of the present invention, the viscosity of the paste should be so that it allows for the necessary handling of the paste during the transfer from the device used for the mixing and to the extruder. It should also allow for the subsequent process steps; i.e. it should be low enough to allow for the extrusion and high enough to ensure that the extruded green body keeps the desired geometry. The viscosity of a given paste can be determined by equipment and methods designed therefore, such as by use of a capillary rheometer which is typically used to measure shear viscosity and other rheological properties. However, since the viscosity is correlated to the hardness of the material, it will also be possible to use this parameter in the determination of whether a given paste is suitable for the manufacturing method or not. A possible related measure to use is the Shore Hardness which can be determined in accordance with ISO 868/ASTM D2240. Another option is to use a special tool designed for clays; this has been used during the development of the present invention. This tool is similar to a Shore tester but has been adapted for the characterization of clays; such an instrument can also be referred to as a durometer for clays. The operating principle is based on the force exerted by the sample material on the penetration of the calibrated spring of the instrument, when a pin of the tool is pressed into the material being tested until the pin reaches a support. In this way, a steady force at a steady stroke is always applied to the instrument. It has a scale from 0 to 20 to use as a relative hardness reference parameter, and gram scale of applied force. With this tool, a penetration point is pressed into the paste when it comes out of the kneader used to mix the paste. Then the maximum value indicated at the moment when the penetration point is inside the paste is measured. The maximum point is used instead of waiting for it to stabilize because it will eventually show a much lower value, maybe getting close to 0 as the penetration point would be forced through the paste. With this method, it has been found that values higher than 12 Shore are necessary to obtain a satisfactory result, at least for the geometries tested.

A binder or a binding agent is any material or substance that holds or draws other materials together to form a cohesive unit mechanically, chemically, by adhesion or cohesion. The binder is preferably organic, such as cellulose ethers, agarose or polyoxymethylene. Examples of binders are: methylcellulose, 25 poly(ethylene oxide), poly(vinyl alcohol), sodium carboxymethylcellulose (cellulose gum), alginates, ethyl cellulose and pitch.

The binder may be in an amount of 2 to 7 weight % of the paste, such as in an amount of 2 to 6 weight % of the paste, or such as in an amount of 3 to 5 weight % of the paste. The liquid, such as water, may be in an amount of 5 to 15 weight % of the paste, such as 5 to 10 weight % of the paste, or it may be in an amount of 10 to 20 weight % of the paste, such as in an amount of 12 to 18 weight % of the paste.

In presently preferred embodiments of the invention, the binder and the liquid are chosen so that the binder is dissolvable in the liquid, and the step of preparing the paste comprises ensuring that the binder is dissolved in the liquid during the mixing. Hereby is meant that when mixing all the components of the paste, the binder is dissolved in the liquid. Different examples of the order of the mixing will be described below.

By "dissolvable" is meant that it is capable of passing into solution, or in other words that it can become or cause to become incorporated into a liquid so as to form a solution. It should preferably be avoided that agglomerates of undissolved binder are present in the paste after the mixing, as that could give rise to inhomogenities that can cause extrusion defects.

By choosing the combination of the binder and the liquid so that the binder is dissolvable in the liquid, and by letting the step of preparing the paste comprise dissolving the binder in the liquid, a component can be manufactured in which the presence of pores are minimized, such as avoided. Thus, a method according to the invention can be used to manufacture non-porous components. By non-porous is meant that the aim is to avoid pores. It does not exclude the presence of pores in so small an amount or in so small sizes that it does not compromise the mechanical properties of the component as required for a given use thereof. E.g. pores may be starting points for crack initiation. Which amount of pores and which pore sizes that are acceptable will depend on e.g. the materials used, the application, and the expected loading during use of the component.

In general, the solvability is at least to some extent dependent on the temperature. Thus, in the description of the present invention, "dissolvable" means at the temperature of the paste being prepared by mixing.

In presently preferred embodiments, the liquid is water, including demineralized water. However, it may also be possible to use other types of liquid which are particularly suitable for mixing with a given combination of powder and binder. Such liquids could e.g. be Ethanol or Isopropyl alcohol.

The paste may also comprise other components, such as viscosity modifiers, dispersants, flocculants, and lubricants. Such other components could be added if necessary to make the extrusion possible for some combinations of materials and geometries of the components being manufactured. However, in some embodiments of the invention, the paste comprises substantially no other components than the powder, the binder and the liquid.

By "extrusion pressure" is preferably meant the pressure in the pressure head during the extrusion. The extrusion pressure is measured as close as possible to the die. It is the pressure which is generated by the compression of the paste against the die by the forward movement of the piston in a piston extruder or the rotation of the one or more screws of a screw extruder.

The drying step is typically performed in a controlled atmosphere involving controlling the temperature and the humidity in which the green body is placed. It may further include passing a flow of gas, such as air, along the green body, and the speed of the flow of the gas may then also be controlled.

Throughout the description, the wording "sintering or oxidized" is used, but this is not meant to exclude that both sintering and oxidation takes place.

The extrusion pressure may be between 50 and 500 bar, such as between 50 and 200 bar, preferably between 60 and 160 bar, most preferably between 60 and 150 bar. If the pressure is too low for a given paste and geometry, the extrusion cannot be performed as the pressure is too low for forcing the paste through the die. If the pressure is too high, the extrusion speed increases which may cause defects in the green body.

The step of preparing the pastes may comprise a step of kneading which has a duration until substantially all the binder is dissolved and until the paste has reached a desired state with respect to homogeneity, viscosity, and hardness. Such a desired state will typically be pre-determined as part of the development work e.g. based on experimentation and possibly also computer simulations.

The step of preparing the paste may comprise the following steps:

- mixing the powder and the binder, and
- adding water and kneading in a kneader, such as a Z-blade kneader or sigma blade kneader. Such a type of mixer has a high torque and a specific geometry of the mixing blades which has been found suitable for obtaining a homogenous mixture of the type of paste as mentioned above, which paste typically has a high viscosity.

In such embodiments, the dry mixture of powder and binder is typically first placed in the kneader and then water is added into the kneader.

The mixing may advantageously take place at room temperature or at least at temperatures low enough to ensure that the liquid does not evaporate; at least not to any undesired extent. It may be necessary to apply some cooling during the kneading to ensure that the frictional forces do not cause too excessive temperature increase.

The step of preparing the paste may be performed in other alternative ways, including:

a) First mixing the powder and the water and then adding the binder.

b) First mixing the binder and the liquid and then adding the powder.

c) Mixing all the ingredients at the same time.

Furthermore, for any of the orders of mixing, it may be performed under controlled vacuum in order to avoid or minimize the presence of air bubbles in the paste. Additionally, vacuum may be applied to the extruder for the same reason before extruding the pastes.

The metal may be any metal that is available as powder. A non-exhaustive list of possible metals include: 316L, FeCrAl, Inconel 625, Hastalloy X, 17-4PH, 430L, and 304L. Some examples of material combinations that have been tested during the development of the present invention are:

- 316L, agarose and water;
- FeCrAl, cellulose ether and water.

The paste may further comprise ceramic particles. A non-exhaustive list of possible ceramics include: AlO, SiO, ZiO, Alumina, Zirconia, Boron Nitride, Cordierite, and Silicon Nitride.

In embodiments comprising ceramic powder, the desired thermal, mechanical, and electrical properties of the component being manufactured for a given application may be obtained by varying one or more of the following parameters:

- the volume ratio between the metal powder and the ceramic powder,
- the size of the ceramic particles, the shape of the ceramic particles, and the type of the ceramic material.

By "size" is meant any measure typically used to describe this parameter in relation to powder. It typically includes taking into account both the average size and the size distribution of the particles.

In some embodiments of the invention, the green body is formed by forcing the paste through a die which is shaped to form the green body in a geometry having at least one longitudinally extending channel. The component being manufactured may have a plurality of longitudinally extending internal channels, such as having a honeycomb structure. Examples of such geometries will be given in relation to the figures. Such a plurality of channels are typically arranged in a regular pattern, but with the present invention it is also possible to extrude components wherein the channels are arranged in an irregular pattern.

By a method according to the invention, the step of extruding the paste preferably thereby directly provides the green body with a shape corresponding to the desired final shape of the component as obtained after the step of sintering or oxidizing. By "corresponding to" is meant that the dimensions typically change a bit due to the chemical reactions taking place during the sintering or oxidizing. For some geometries, this may also give rise to minor changes in shape. But the overall final shape is caused by the paste being forced through the die of the extruder so that the green body thereby obtains a shape matching the shape of the die. This will be illustrated in the figures. Such a shaping method differs from e.g. 3D-printing, where the shape of the component is obtained by moving the die, also referred to as a nozzle, and/or a working platform holding the component being manufactured relative to each other and building the component layer by layer.

The sintering may e.g. be done in a reducing atmosphere, in vacuum, or in an inert atmosphere. The sintering is typically performed in a furnace at temperatures of 950 to 1430 degrees C.

A method according to the present invention may be particularly advantageous for the manufacturing of a component having a plurality of longitudinally extending internal channels. The walls forming the longitudinally extending internal channels may have a wall thickness of between 0.25 and 2 mm, such as between 0.25 and 1 mm, such as between 0.25 and 0.5 mm. Such components are very hard or impossible to manufacture with known methods. Such geometries are today typically manufactured by stacking of corrugated plates and then soldering or welding them together. In addition to this being a more cumbersome method than the present invention, it also involves a risk of formation of weaknesses and defects at the joining regions. The work leading to the present invention has shown that it is possible to manufacture components with thin walls despite the high density of the metal. In addition to the claimed features, this may need the use of powder with small particle sizes, such as powders referred to as "80%-22 μm" which means that 80% of the powder is less than 22 micron.

In some embodiments of the invention, the step of drying comprises guiding a flow of gas through the at least one longitudinally extending channel. Hereby a more uniform drying throughout the component can be obtained. Studies made as part of the development leading to this invention have shown that such a drying step makes it easier to ensure that the component maintains its intended shape without deforming or cracking. This is particularly relevant for complex geometries or small wall thicknesses, such as for a component having a large number of longitudinally extending inner channels. The gas may e.g. be atmospheric air which may have a higher or lower temperature and/or a higher or lower humidity than the surrounding air.

In the embodiments of the invention wherein the step of drying comprises guiding a flow of gas through the at least one longitudinally extending channel, this step may further comprise covering outer surfaces of the green body, e.g. with plates, so that the drying takes place due to the flow of gas through the at least one longitudinally extending channel only as evaporation from the outer surfaces is prevented. This has been found to provide for a more uniform drying at least for some geometries of the component being manufactured.

The step of drying may comprise using a drying tool, the drying tool comprising:

a first end comprising or being connectable to a gas flow generating device, and an opposite second end comprising a plurality of nozzles each in fluid communication with the first end so that gas can flow through each of the nozzles under the action of the gas flow generating device during use of the drying tool.

In such embodiments, the following steps may precede the step of drying:

arranging the drying tool in relation to the green body so that a nozzle of the drying tool extends into an end region of each of the at least one longitudinal channel of the green body, and activating the gas flow generating device so that gas flows into each of the at least one longitudinal channel. An example of a possible design of a drying tool which can be used to perform such a drying step will be given in the figures. For embodiments having a plurality of longitudinal channels, it will also be possible to dry in a similar manner but to guide the gas flow through a majority, but not necessarily all, of the longitudinal channels.

By using a drying tool as described and letting the nozzles extend into each or a majority of the longitudinally extending channels, a uniform drying throughout the volume can be ensured. In addition, the nozzles may be shaped and dimensioned so that they provide structural support to the part of the walls of the at least one longitudinally extending channel that is in contact with the tool and thereby prevent deformation thereof. The advantage thereof is both that the component remains undeformed and that the gas flow is not hindered as it could be by deformed, such as collapsed, longitudinally extending channels.

In presently preferred embodiments, the step of extruding is performed at room temperature and with the paste having a temperature of at most 50 degrees Celsius, such as at most 40 degrees Celsius throughout the extrusion step. The step of extruding may be performed at room temperature and with the paste having a temperature of at most 30 degrees Celsius, such as at most 25 degrees Celsius, throughout the extrusion step. By keeping the temperature relatively low, the properties of the paste may be easier to control over time, since no significant amount of water will evaporate at these temperatures, and for the binders typically used, the binder will not reach its gelation temperature during the extrusion.

In any of the embodiments as described above, a step of debinding may precede the step of sintering or oxidizing, the debinding step typically comprising heating the green body to a temperature at which at least some, such as all, of the binder burns off. This debinding step is typically performed after the step of drying. Debinding is the process in which the binder is removed from the green body to ensure that no leftover carbon is present in the component during sintering or oxidizing. This debinding is typically done by heating the green body to a temperature between 200 to 750 degrees Celsius and allowing the binder to burn off. Different binders require different debinding temperatures. In embodiments using methylcelulose, the debinding is done in an oxidizing atmosphere, typically air, but it can also be done partially in the same atmosphere as the sintering atmosphere, if the final component is not ruined by the extra content of carbon. In order to ensure that the debound green body can still be handled, it may be necessary to oxidize the powder slightly together; these oxides will be removed in the sintering process.

BRIEF DESCRIPTION OF THE FIGURES

The method of manufacturing a component according to the invention will now be described in more detail with regard to the accompanying figures. The figures show one way of implementing the present invention and is not to be construed as being limiting to other possible embodiments falling within the scope of the attached claim set.

FIG. 3.*c* shows schematically an example of a die that can be used for manufacturing of a component with an array of longitudinally extending inner channels.

FIG. 4.*a* is a side view, and FIG. 4.*b* is three-dimensional partial view of the second end comprising nozzles.

DETAILED DESCRIPTION OF AN EMBODIMENT

Figure 1:
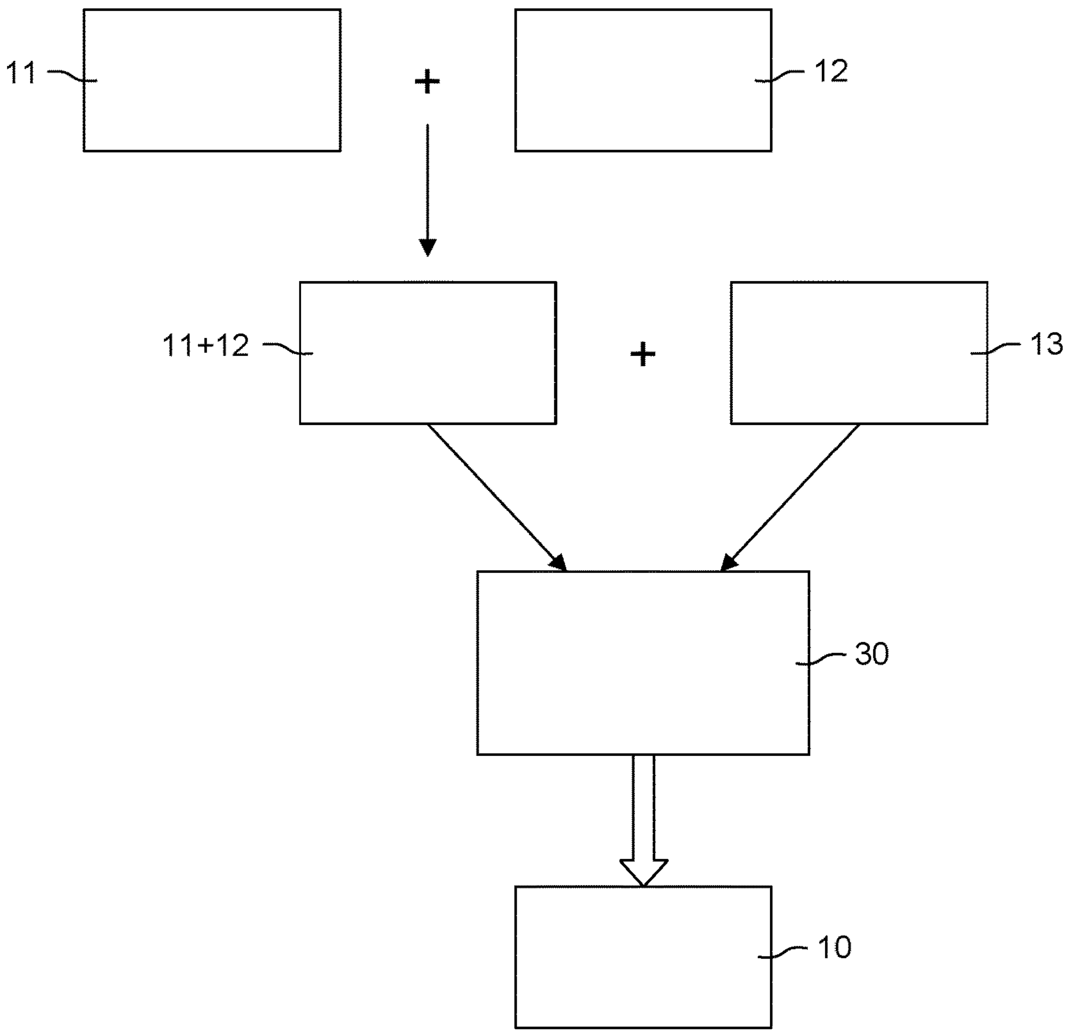
FIG. 1 is a flow-chart of the step of preparing a paste in an embodiment of a method according to the invention.

FIG. 1 is a flow-chart of the step of preparing a paste 10 in an embodiment of a method according to the invention. The paste 10 is prepared by first mixing a powder 11 and a binder 12 in an amount of 2 to 8 weight % of the paste 10. As explained above, the combination of the binder and the liquid is preferably chosen so that the binder is dissolvable in the liquid, and the step of preparing the paste comprises dissolving the binder in the liquid during the mixing. The powder 11 comprises metal and may also comprise ceramic. The liquid is in the following described as being water 13, but other liquids may also be used as mentioned above. It is added in an amount of 5 to 25 weight % of the paste 10. In the illustrated embodiment, the adding of water 13 and kneading to obtain a homogenous paste is performed in a kneader 30, such as a Z-blade kneader or sigma blade kneader.

Figure 2:
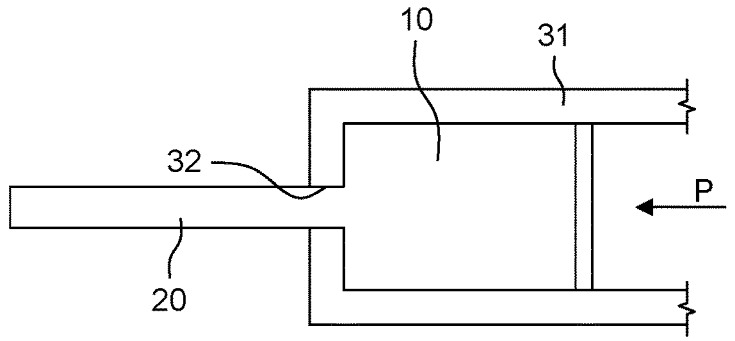
FIG. 2 shows schematically how the paste is extruded into a green body.

The prepared paste 10 is then transferred to an extruder 31, where it is extruded into a green body 20 as shown schematically in FIG. 2. This step is performed by using an extrusion pressure P of more than 50 bar. In some embodiments of the invention, the extrusion pressure P is between 50 and 500 bar, such as between 50 and 200 bar, preferably between 60 and 160 bar. The green body 20 is then dried and sintered or oxidized in order to obtain the final component.

In presently preferred embodiments of the invention, the step of extruding is performed at room temperature and with the paste having a temperature of at most 50 degrees Celsius, such as at most 40 degrees Celsius, preferably at most 30 degrees Celsius. Since the friction between the paste being extruded and the processing equipment may cause an undesired temperature increase in the paste, some cooling of the extrusion die and the extrusion chamber can be necessary in order to be able to control the temperature.

Figure 3A:
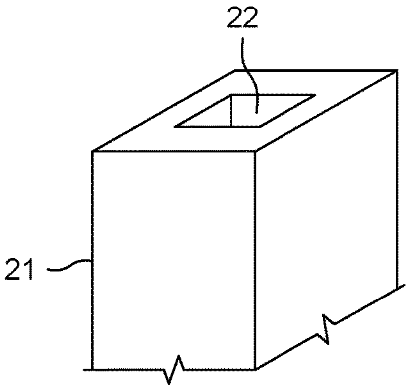
FIGS. 3.*a* and 3.*b* show schematically examples of different components that can be manufactured by a method according to the present invention.
Figure 3B:
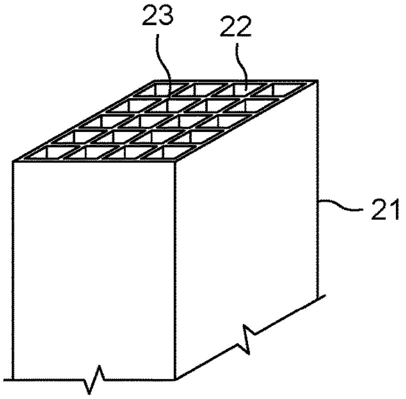
Figure 3C:
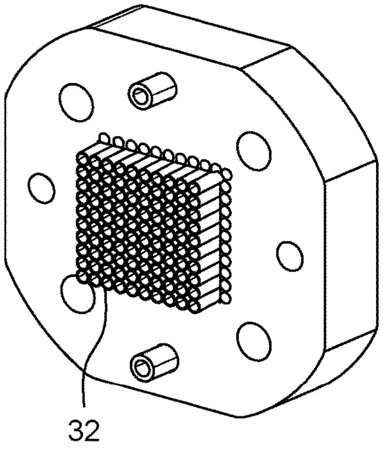

In some embodiments of the invention, the green body 20 is formed by forcing the paste 10 through a die 32 which is shaped to form the green body 20 in a geometry having at least one longitudinally extending channel. FIG. 3 shows schematically examples of such embodiments. FIG. 3.*a* shows a component 21 having one longitudinally extending channel 22, and FIG. 3.*b* shows a having a plurality of longitudinally extending internal channels 22 which are arranged in a regular pattern. These geometries are obtained by using dies 32 having shapes and arrangements corresponding to the cross-sectional shapes of the components. FIG. 3.*c* shows an example of a possible design of a die 32 that can be used for the manufacturing of a component 21 having an array of longitudinally extending internal channels.

Experiments performed during the development work leading to the present invention have shown that it is possible to manufacture components 21, wherein walls 23 forming the longitudinally extending internal channels 22 have a wall thickness of between 0.25 and 2 mm, such as between 0.25 and 1 mm, such as between 0.25 and 0.5 mm.

Figure 4A:
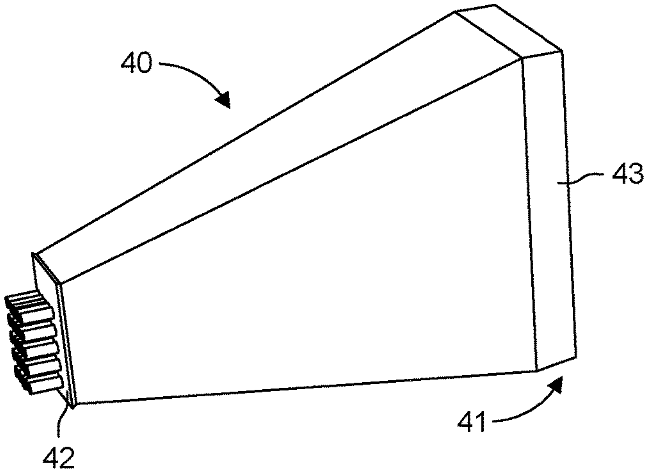
FIG. 4 shows schematically an embodiment of a drying tool which is used in some embodiments of the present invention.
Figure 4B:
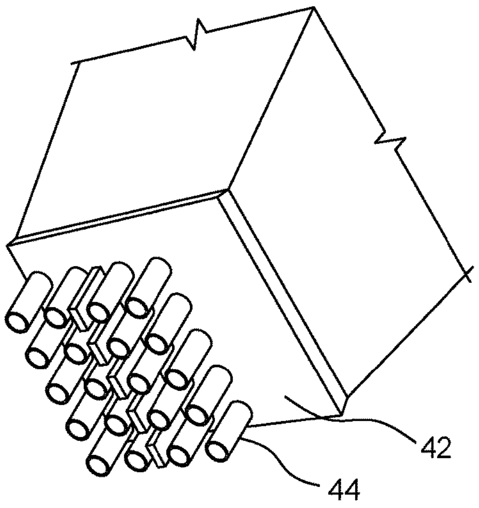

In a method according to the present invention, the step of drying the green specimen before sintering or oxidizing may comprise guiding a flow of gas through the at least one longitudinally extending channel. This can e.g. be done by use of a drying tool 40 as shown schematically in FIG. 4. FIG. 4.*a* is a side view illustrating that the drying tool 40 has a first end 41 comprising or being connectable to a gas flow generating device 43, and an opposite second end 42 comprising a plurality of nozzles 44. The nozzles 44 are in fluid communication with the first end 41 so that gas can flow through each of the nozzles 44 under the action of the gas flow generating device 43 during use of the drying tool 40. FIG. 4.*b* is three-dimensional partial view of the second end 42 comprising nozzles 44. In the illustrated embodiment, the nozzles 44 are arranged in a regular pattern of aligned rows and columns.

Figure 5:
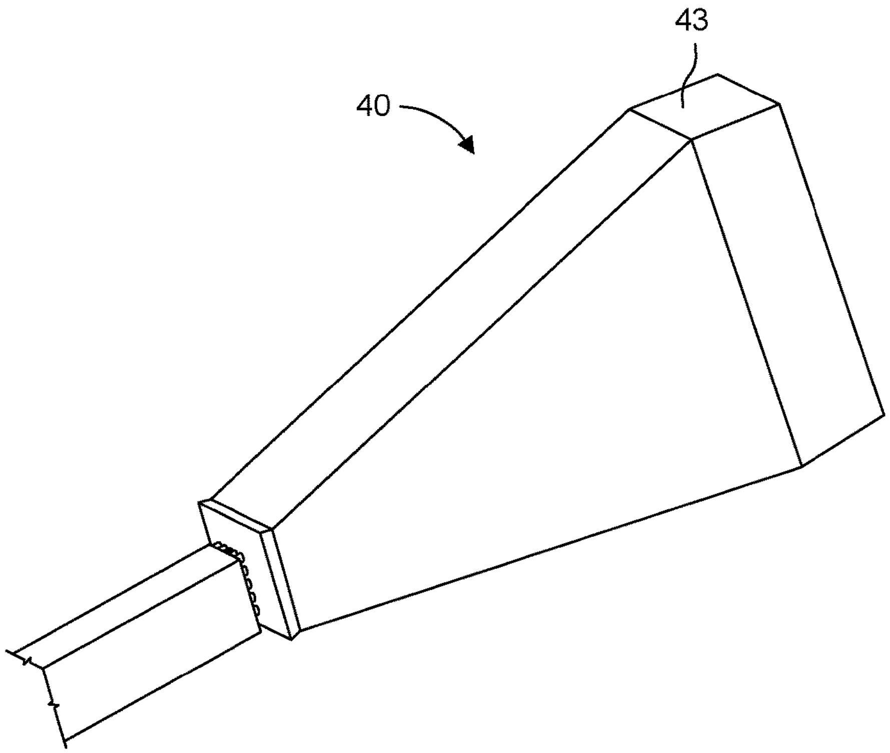
FIG. 5 shows schematically how the drying tool of FIG. 4 can be arranged with the nozzles being engaged with end sections of channels of a green body during drying.

FIG. 5 shows how the drying tool 40 of FIG. 4 can be arranged with the nozzles 44 being engaged with, such as extending into, end sections of the longitudinally extending channels 22 of a green body 20 during drying. It has to be ensured that the nozzles 44 do not damage the green body 20. When the nozzles 44 have been arranged, the gas flow generating device 43 is activated so that gas flows into each of the longitudinally extending channels 22. By using a drying tool 40 as described and letting the nozzles 44 extend into each or a majority of the longitudinally extending channels 22, a uniform drying throughout the volume can be ensured. In addition, the nozzles 44 may be shaped and dimensioned so that they provide structural support to the part of the walls 23 of the at least one longitudinally extending channel 22 that is in contact with the drying tool 40 and thereby prevent deformation thereof. The advantage thereof is both that the green body 20 remains undeformed and that the gas flow is not hindered as it could be by deformed, such as collapsed, longitudinally extending channels 22.

Figure 6:
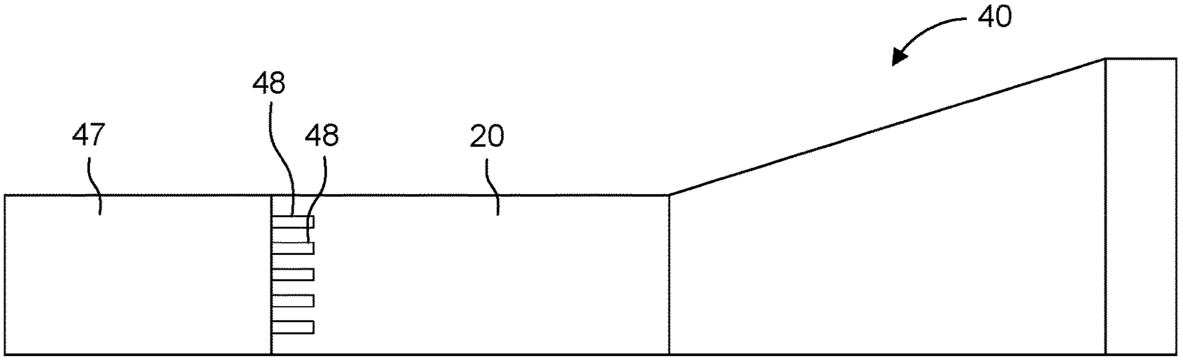
FIG. 6 shows schematically a step of drying wherein an auxiliary tool is used to support the green body.

FIG. 6 shows schematically how an auxiliary tool 47 can be arranged at an opposite end of the green body 20 as the one where the drying tool 40 is arranged. The auxiliary tool 47 is used to support the longitudinally extending channels 22 during drying. In FIG. 6 this is shown schematically as small pins 48 protruding from an end surface of the auxiliary tool 47 so that they can extend into the longitudinally extending channels 22 of the green body 20 being dried.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. Method of manufacturing a component from metal-containing powder, the method comprising the following steps:

preparing a paste by mixing at least:
- a powder comprising metal,
- a binder in an amount of 3 to 5 weight % of the paste,
- liquid in an amount of 5 to 15 weight % of the paste, transferring the paste to an extruder, extruding the paste into a green body by using an extrusion pressure (P) of more than 50 bar, wherein the green body has at least one longitudinally extending internal channel having one or more walls, drying the green body, wherein the step of drying includes guiding a flow of gas through the at least one longitudinally extending internal channel, wherein the step of drying further comprises using a drying tool, the drying tool including:
- a first end comprising or being connectable to a gas flow generating device, and
- an opposite second end including a plurality of nozzles each in fluid communication with the first end so that gas can flow through each of the nozzles under the action of the gas flow generating device during use of the drying tool, the nozzles are shaped and dimensioned so that they provide structural support to a portion of the walls of the at least one longitudinally extending internal channel that is in contact with the tool and thereby prevent deformation of the walls, and sintering or oxidizing the dried green body to bond the powder together and thereby form the component.

2. Method according to claim 1, wherein the binder and the liquid are chosen so that the binder is dissolvable in the liquid, and wherein the step of preparing the paste comprises ensuring that the binder is dissolved in the liquid during the mixing.

3. Method according to claim 1, wherein the extrusion pressure (P) is between 50 and 500 bar.

4. Method according to claim 1, wherein the step of preparing the paste comprises a step of kneading which has a duration until substantially all the binder is dissolved and until the paste has reached a desired state with respect to homogeneity, viscosity, and hardness.

5. Method according to claim 1, wherein the step of preparing the paste comprises the following steps:
- mixing the powder and the binder, and
- adding water and kneading in a kneader.

6. Method according to claim 1, wherein the paste further comprises ceramic particles.

7. Method according to claim 1, wherein the green body is formed by forcing the paste through a die which is shaped to form the green body in a geometry having the at least one longitudinally extending internal channel.

8. Method according to claim 7, wherein the one or more walls forming the at least one longitudinally extending internal channel have a wall thickness of between 0.25 and 2 mm.

9. Method according to claim 1, wherein the step of drying further comprises covering outer surfaces of the green body so that the drying takes place due to the flow of gas being through the at least one longitudinally extending channel only.

10. Method according to claim 1, wherein the following steps precede the step of drying:
- arranging the drying tool in relation to the green body so that a nozzle of the drying tool extends into an end region of each of the at least one longitudinally extending internal channel of the green body, and
- activating the gas flow generating device so that gas flows into each of the at least one longitudinally extending internal channel.

11. Method according to claim 1, wherein the step of extruding is performed at room temperature and with the paste having a temperature of at most 30 degrees Celsius.

12. Method according to claim 1, wherein a step of debinding precedes the step of sintering or oxidizing, the debinding step comprising heating the green body to a temperature at which at least some of the binder burns off.

13. Method according to claim 3, wherein the extrusion pressure (P) is between 50 and 200 bar.

14. Method according to claim 1, wherein the extrusion pressure (P) is between 60 and 150 bar.

15. Method according to claim 5, wherein the kneader is a Z-blade kneader or a sigma blade kneader.

16. Method according to claim 8, wherein the one or more walls forming the at least one longitudinally extending internal channel have a wall thickness of between 0.25 and 1 mm.

17. Method according to claim 1, wherein the step of extruding is performed at room temperature and with the paste having a temperature of at most 40 degrees Celsius throughout the extrusion step.

* * * * *